United States Patent Office 2,788,370
Patented Apr. 9, 1957

2,788,370
METHOD OF PREPARING GLUTAMINE

Stephen Rath, New York, N. Y.

No Drawing. Application July 11, 1955,
Serial No. 521,386

3 Claims. (Cl. 260—534)

This invention relates to the preparation of L-glutamine and has particular relation to the preparation of L-glutamine from glutamic acid over the L-pyrrolidone carboxylic acid. The invention also relates to the conversion of L-pyrrolidone carboxylic acid into a compound which in turn can be converted into glutamine in the manner described hereinafter.

The main object of the present invention is to provide a process for preparing glutamine from glutamic acid.

Another object of the invention is the conversion of L-pyrrolidone carboxylic acid into glutamine over an intermediate compound.

Other objects and the advantages of the invention will be apparent from the appended claims and the following specification which describes by way of example and without limitation an embodiment of, and a best mode for, carrying out the invention.

Example

L-glutamic acid is heated for about 60 hours to 100° C. in 5% aqueous solution, or autoclaved at 120° C. for about 8 hours. From the solution L-pyrrolidone carboxylic acid of the formula

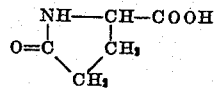

is obtained by evaporating the solution to dryness, extracting the residue with ethanol and precipitating the product with ether.

50 grams of the L-pyrrolidone carboxylic acid thus obtained, are mixed with 350 grams of absolute hydrazine (95% base) and the solution is heated 3 hours at 100° C. in a sealed container. The hydrazine is then distilled off in vacuo and the remaining syrup repeatedly triturated with ethanol and the ethanol removed. A crystalline compound corresponding to the formula

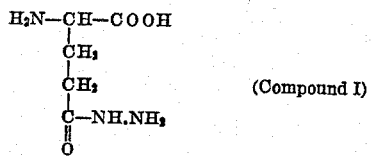
(Compound I)

i. e. γ-L-glutamyl hydrazide is thus obtained, which is recrystallized from a minimum amount of hot water with the addition of 1 to 2 parts of ethanol to 1 part of water. Compound I has a melting point of 160° C., is soluble in water, but not soluble in absolute ethanol and ether.

10 grams of this compound (I) are mixed with 200 ml. of 80% methanol and 100 grams of Raney nickel and the mixture is heated under reflux for 6-8 hours until approximately 90% of the calculated amount of ammonia has been liberated. The Raney nickel is filtered off and washed with hot water. The blue solution is taken down in vacuo to a small volume, treated with $H_2S$ and filtered and the filtrate is concentrated to a small volume. On addition of ethanol, L-glutamine is obtained, in a yield of L-glutamine of about 65% based on the weight of the above compound (I).

The L-glutamine obtained by this procedure has the following characteristics:

MP = 177° C. uncorr.
N = 19.0% (Calc. 19.2%)
Amide N = 9.5% (Calc. 9.6%)
Free $NH_3$ = 0
$[\alpha]_D^{25} = +7.1°$ (3.1% in water)
Ash < 0.01%

The conversion of compound I to glutamine may also be accomplished by reduction with a suitable hydride, e. g. sodium borohydride.

10 gm. of compound I are dissolved in 50 ml. of hot water and warmed with an excess of $CuCO_3$. Insoluble material is filtered off and the solution is buffered to pH 6 with acetate buffer (final concentration 0.5 M). 10 gm. of sodium borohydride is added in portions to the solution at room temperature under constant stirring over 30 minutes. After stirring for 3–5 hours, the mixture is acidified with glacial acetic acid to pH 2, the Cu removed with $H_2S$ and the solution brought to dryness under vacuum. The residue is extracted with glacial acetic acid. The insoluble glutamine is recrystallized from water ethanol. L-glutamine is obtained in a yield of 50–60%.

It will be understood that this invention is not limited to the specific conditions, solvents, agents and other details specifically described above and can be carried out with various modifications. For example, the reaction between the L-pyrrolidone carboxylic acid and hydrazine can be carried out in organic solvents and in the conversion of compound (I) into glutamine other solvents and other agents having the effect of Raney-nickel can be used. Furthermore, hydrazinolysis and reduction to corresponding amides can be applied also to homologues of pyrrolidone-carboxylic acid and to five- and six membered lactones.

Reference is made to my application filed under Serial No. 496,323 on March 23, 1955, now abandoned, for "Method of Preparing Glutamine," of which this is a continuation-in-part.

What is claimed is:

1. A process for preparing L-glutamine, comprising treating L-pyrrolidone carboxylic acid with hydrazine in order to convert it into γ-L-glutamyl hydrazide and converting the latter into glutamine by treating its solution with a reducing agent.

2. A process for preparing L-glutamine, comprising treating L-pyrrolidone carboxylic acid with hydrazine in in order to convert it into γ-L-glutamyl hydrazide and converting the latter into glutamine by heating its solution with Raney nickel.

3. A process for preparing L-glutamine, comprising treating L-pyrrolidone carboxylic acid with hydrazine in in order to convert it into γ-L-glutamyl hydrazide and converting the latter into glutamine by sodium borohydride.

References Cited in the file of this patent

UNITED STATES PATENTS 2,543,345    Waller et al.    Feb. 27, 1951

FOREIGN PATENTS 28-1582    Japan    Apr. 15, 1953

OTHER REFERENCES

Fieser & Fieser Organic Chem. (2nd ed.), 1950, pg. 117.

Akabori et al. Chem. Abs., vol. 48 (1954), col. 12796.